Aug. 28, 1956   R. G. LE TOURNEAU   2,761,097
VOLTAGE REGULATING SYSTEM
Filed July 17, 1953   3 Sheets-Sheet 1

INVENTOR.
ROBERT G. LE TOURNEAU
BY Lyon & Lyon
ATTORNEYS

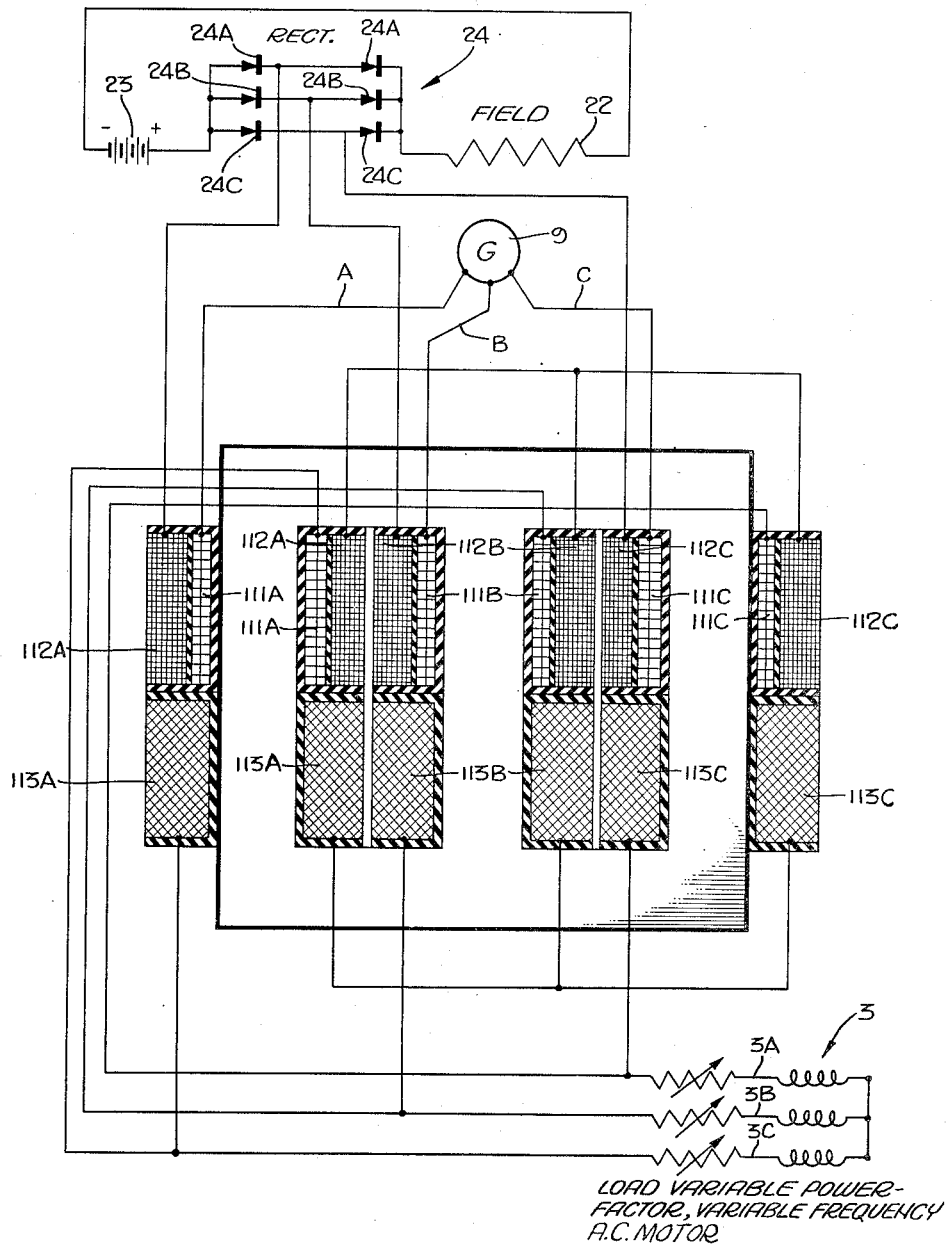

Aug. 28, 1956 R. G. LE TOURNEAU 2,761,097
VOLTAGE REGULATING SYSTEM
Filed July 17, 1953 3 Sheets-Sheet 3
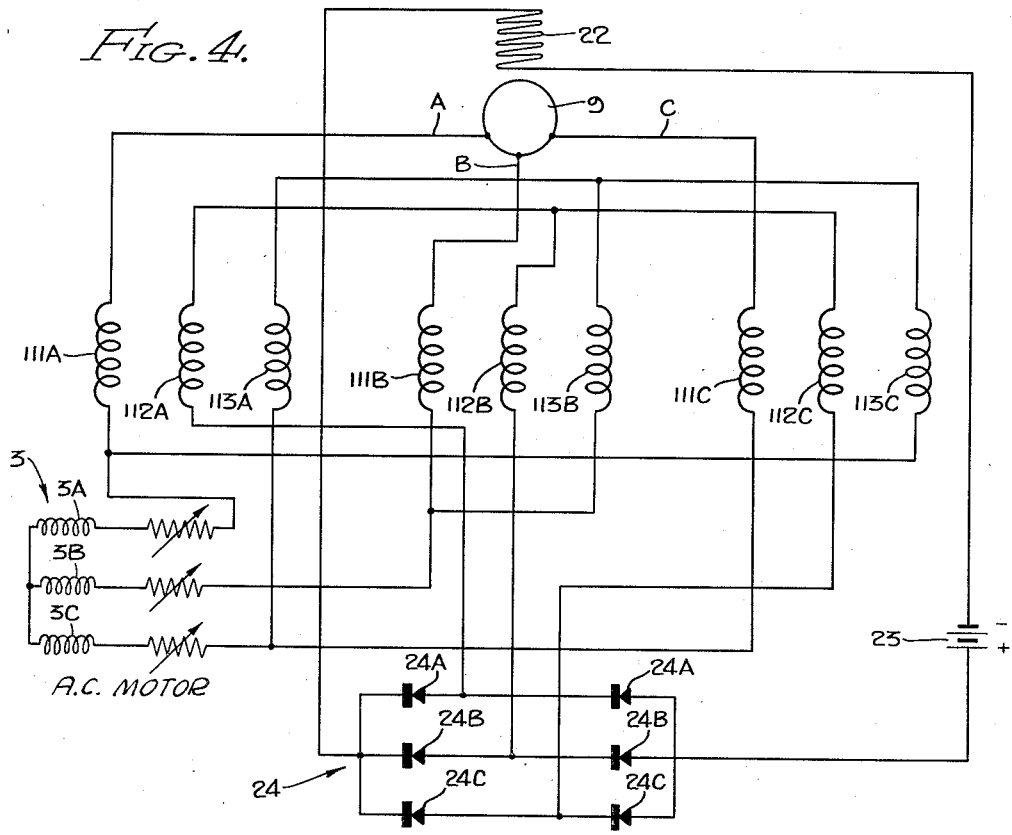
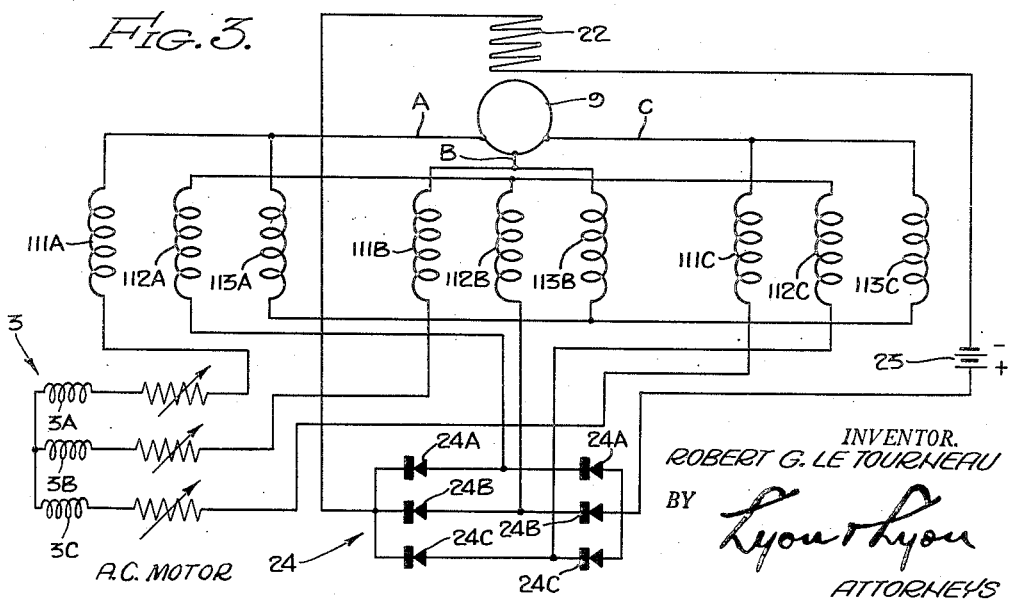
INVENTOR.
ROBERT G. LE TOURNEAU
BY Lyon & Lyon
ATTORNEYS

United States Patent Office

2,761,097
Patented Aug. 28, 1956

2,761,097

VOLTAGE REGULATING SYSTEM

Robert G. Le Tourneau, Longview, Tex.

Application July 17, 1953, Serial No. 368,687

17 Claims. (Cl. 318—148)

The present invention relates to an improved regulating system involving an alternating current generator, the speed of which either may be maintained constant or varied to produce corresponding speed changes in an alternating current motor connected thereto.

The voltage regulating system described herein incorporates novel means and techniques.

Briefly, the system described herein avoids the use of any moving parts and features, a special regulating transformer construction and connections between the alternating current generator and the alternating current motor. The regulating system is such as to provide satisfactory operation when either the generator speed, i. e. frequency, is changed, or when the generator speed, i. e. frequency, is maintained substantially constant. When the generator speed is maintained substantially constant the system functions so as to tend to maintain the voltage at the load, i. e., motor, substantially constant in spite of large variations in load current supplied to the load, i. e., motor. When the generator speed or the frequency is varied for purposes of producing speed changes or speed control of the motor, the system automatically functions to maintain the correct saturation of the magnetic circuit of the motor so as to provide a variable speed control of an alternating current motor in which the correct voltage for the particular frequency of operation is automatically provided over a relatively large range of frequencies whereby the speed of the motor may be controlled by simply varying the speed of the generator. This entails more than ordinary voltage regulation as such, but involves maintaining the saturation of the magnetic circuit of the motor in a satisfactory condition, even though the frequency of the current supplied thereto varies, of course, in accordance with the speed of the generator.

In general, the regulating system involves a special transformer with three separate windings on each leg of a three phase transformer core. One of such windings comprises a so-called "current winding" which is connected in series between the generator and the motor, such winding being wound directly around the laminated core, but only along a fractional length of the core, leaving part of the core bare for a third winding referred to herein as a "compensating winding." A second winding referred to herein as a "booster" winding is wound around the first mentioned current winding so that such first current winding and the second booster winding are closely coupled, such second booster winding being connected through suitable rectifier means to the field of the generator to thereby tend to cause the voltage of the generator to increase with increased loading of the generator. The aforementioned third or compensating winding is wound directly on the laminated core in the space alongside of the first and second windings, such compensating winding being loosely coupled magnetically with the current and booster windings and being connected in magnetic opposition to or in "bucking" relation to the first or current winding. In other words, the magnetomotive force produced in the core by current flowing in response to the voltage applied to the third or compensating winding by the generator acts in opposition to the magnetomotive force produced by the load current in the first or current winding. This compensating winding, as illustrated, may be connected in either one of two positions circuit-wise in the system.

It is, therefore, a general object of the present invention to provide an improved regulating system of this character.

A specific object of the present invention is to provide a speed control system for an alternating current motor, with the speed of the motor being adjustable over a relatively large range of speeds.

Another specific object of the present invention is to provide an improved regulating system of this character which does not require any moving parts in the control thereof.

Another specific object of the present invention is to provide an improved regulating system of this character in which a current winding is closely coupled magnetically with respect to a so-called booster winding, and a compensating winding is loosely coupled with respect to the current winding and connected to produce a magnetomotive force in opposition to that of said current winding.

Another specific object of the present invention is to provide improved means and techniques in transformer construction used in regulating systems of this character.

The features of the present invention which are believed to be novel are set forth with particularity in the appended claims. This invention itself, both as to its organization and manner of operation, together with further objects and advantages thereof, may be best understood by reference to the following descriptions taken in connection with the accompanying drawings in which:

Figures 1 and 2 show the apparatus partly in schematic form and partly in structural form incorporated in a regulating system which embodies features of the present invention.

Figures 3 and 4 show in simplified form the arrangement illustrated in Figures 1 and 2 respectively.

Figure 1:
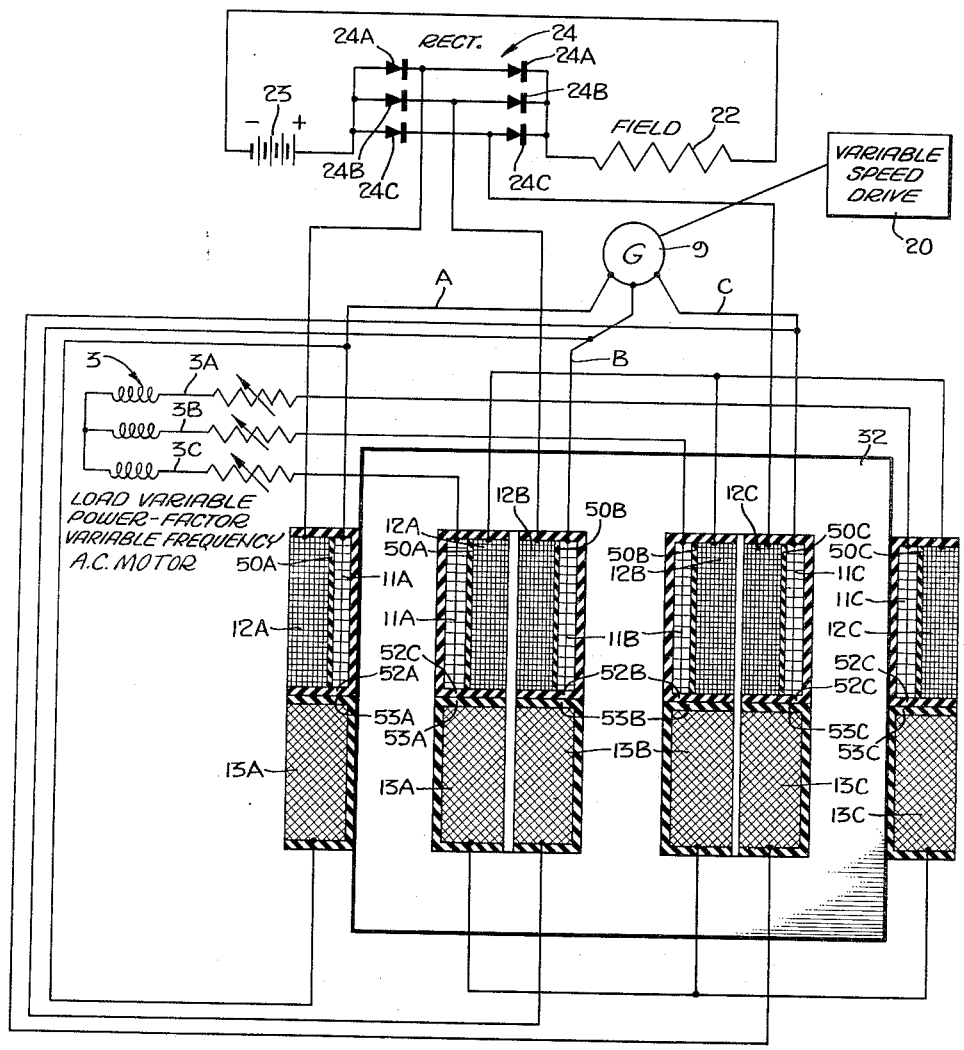

Referring to the arrangement illustrated in Figure 1, the three phase alternating current generator 9 is arranged to supply power to a three phase load 3, such load being a three phase motor. The three connectors extending from the generator 9 are designated respectively by the letters A, B, and C, which represent phase A, phase B and phase C. There are three transformer windings associated with each phase, in both modifications illustrated in Figures 1 and 2. A first winding is designated as a current winding and is represented generally by the reference numeral 11 in Figure 1 and by the reference numeral 111 in Figure 2. A second winding is referred to as a booster winding and is designated generally by the reference numeral 12 in Figure 1 and by reference numeral 112 in Figure 2; the third winding associated with each phase is designated as a compensating winding and is represented generally by the reference numeral 13 in Figure 1 and by reference numeral 113 in Figure 2.

For purposes of simplicity those windings associated directly with phase A are designated by reference numerals as noted above, but with the capital letter A applied thereto to designate association with phase A. Likewise, reference numerals having the capital letter B applied thereto indicate that the windings are associated with phase B; further, the windings designated by reference numerals with the capital letter C applied thereto designate those windings associated directly with phase C.

With specific reference to Figures 1 and 3, the load, or three phase motor 3, is designated as being star connected with windings 3A, 3B and 3C designated respectively as the windings in phases 3A, 3B and 3C. An adjustable resistance is shown connected in series with such windings 3A, 3B and 3C to indicate that the load is variable, also the labels indicate that the power factor of the load is variable and, generally, such motor 3 receives voltages at different frequencies for purposes of speed control.

The rotor of the generator 9 may be driven either at a constant speed or at a variable speed by a variable speed prime mover represented by the variable speed drive 20 in Figure 1. The motor winding 3A is connected to phase A of the generator 9 through the first of current winding 11A. Likewise, the winding 3B has one of its terminals connected to phase B through the current winding 11B; and similarly, phase C is connected to the motor winding 3C through the current winding 11C. The windings 3A, 3B and 3C are connected in star. The generator 9 has associated therewith the field winding 22 which is serially connected with the continuous voltage source 23 through a rectifier having the general reference numeral 24. Such rectifier 24 actually consists of a pair of serially connected rectifiers 24A, a pair of serially connected rectifiers 24B and a pair of serially connected rectifiers 24C. The junction point of rectifiers 24A is connected to one terminal of the second or booster winding 12A; the junction point of rectifiers 24B is connected to one terminal of the booster winding 12B; the junction point of rectifiers 24C is connected to one terminal of booster winding 12C, the other terminals of windings 12A, 12B and 12C being interconnected so that such windings are connected in a star connection.

The third or compensating winding 13A has one of its terminals connected to phase A of generator 9; the compensating winding 13B has one of its terminals connected to phase B of generator 9; the compensating winding 13C has one of its terminals connected to phase C of generator 9. The other terminals of the compensating windings 13A, 13B and 13C being interconnected so that such compensating windings 13A, 13B and 13C are considered to be connected in a star connection.

The manner in which the current winding, booster winding and compensating winding in each of the three phases are magnetically associated on a common laminated core of a three phase core structure is considered to be of importance in providing the desired regulation. As indicated in Figure 1, the laminated core of the three phase transformer is represented by the reference numeral 32.

It is observed that the primary excitation of the generator 9 is accomplished by current from the constant voltage direct current source 23. A voltage is induced in the second or booster windings 12A, 12B and 12C which is rectified by the rectifier 24 to produce an additional exciting current for the generator field 22 which current is added to the current which is occasioned by the source 23 above. The current thus derived from these second windings 12A, 12B and 12C tends to boost the excitation of the generator 9 as the load requires, i. e., as the current through the first or current windings 11A, 11B and 11C requires; however, the voltage developed in the second or booster windings 12A, 12B and 12C is also dependent upon the power factor of the load 3 and the frequency of the currents being supplied thereto, i. e., the speed at which the rotor of the generator 9 is rotated.

It is understood that the first and second windings, i. e., the current and booster windings in each phase are closely or tightly coupled so that there is close or tight coupling between the current and booster windings in each phase. On the other hand, the third or compensating winding is loosely coupled to the booster winding of the corresponding phase so that there is what is called "loose" coupling between the windings 11 and 13 in each phase. The manner in which such loose and close coupling is accomplished resides in the physical spacing of the windings with respect to the core structure as shown in Figure 1.

For purposes of definition, "close coupling" and "loose" coupling are defined in the following terms which are found in Rogerts' Dictionary of Electrical Terms, 4th Edition, reprinted 1947 (Sir Isaac Pitman & Sons, Ltd., London):

"*Close coupling. See tight coupling.*—Coupling of two circuits where the Coupling Factor is high, e. g. in the case of Inductive Coupling where a large proportion of the lines of force pass through both the primary and secondary coils, i. e., where there is little magnetic leakage so that a considerable proportion of the energy at one circuit can be transferred to the others." Cf. Loose coupling.

"*Loose coupling.*—Coupling of two circuits where the coupling factor is low, e. g. inductive coupling where there is considerable magnetic leakage and only a small proportion of the energy in one circuit can be conveyed to the other."

The third or compensating winding in each phase is connected in "bucking" relation, or in opposition, to the first or current winding across the generator output terminals as shown in Figures 1 and 3. By these means, the current and voltage in such third, compensating or saturation control winding serves to vary the coupling between the booster winding and the current winding in such a manner as to automatically maintain the correct field voltage boost to meet the load or frequency condition which is likely to be encountered. The output voltage of the generator 9 remains substantially constant when the generator is driven at a substantially constant speed, but such output voltage varies in proper proportion to the speed of the generator, when its speed is varied, so as to maintain proper regulation between voltage and frequency. It is essential that the magnetic circuit of the motor 3 be energized to maintain the correct saturation. The magnetic circuit for the motor is essentially an inductive reactance, which, of course, varies with frequency, the higher the frequency, the greater the reactance and hence, the greater is the voltage required to produce the equivalent saturation current, i. e., same saturation flux. In other words, as the speed of the generator is decreased, the frequency of the alternations decreases and the speed of the motor decreases. This decrease in generator speed tends to result in a reduction in generator output voltage, this decrease in output generator voltage being desired, since the reactance of the magnetizing circuit for the motor, at the lower frequency, likewise decreases so that a smaller voltage is required to produce the desired saturation in the motor. Also, since the compensating winding or saturation control winding is energized in accordance with the voltage at the generator, the higher the generator voltage, the more the compensating winding acts to neutralize the magnetic lines of flux induced in the iron by the current winding, thus weakening or lowering the voltage induced in the booster winding automatically to thereby weaken or decrease the current flow through the generator field to thereby correct the over-voltage condition which might otherwise occur under certain combinations of load, power factor and speed.

It is observed that this arrangement is responsive both to current and voltage, i. e., ampere output and voltage are both used in this control. Techniques used in the control involve the relatively simple manner of lessening the output of a transformer by presaturating the core of the transformer. In other words, there is a condition where increased current flow through the current winding and/or increased current flow through the compensating winding produces a relatively small effect on the excitation of the generator due to the saturated nature of the core at that particular time. Hence, it is contemplated that in certain operating conditions, the magnetic core of the transformer will become saturated. Further, as mentioned above, the system described herein uses to advantage the fact that in an inductive alternating current circuit, the lower the frequency, the lower the voltage required to cause the same amount of current to flow, as described above. The system combines these natural tendencies for the output voltage of the generator to be in harmony with the frequency and speed to cause the motor to develop the same torque whether running at rated speed or a fractional part of the rated speed.

In effecting the above mentioned relationship of boost and tight coupling, the windings are disposed as illustrated in Figure 1, with the current winding 11B abutting the magnetic core and extending only a fractional part of the length of the leg of the core, the second or booster winding being disposed on the current winding with a layer of insulation 50 being disposed between the current winding and the booster winding. The compensating or saturation control winding 13 in each corresponding phase, extends the remaining portion of the length of the leg. The width of the winding 13B is substantially equal to the combined widths of the windings 11 and 12. Relatively thick layers of insulating material 52 and 53 are disposed between, on the one hand the current and booster windings and, on the other hand, the saturation control winding 13.

In the arrangement illustrated in Figures 2 and 4 elements which correspond to those elements illustrated in Figures 1 and 3 have either the same reference numeral or the same reference numeral raised 100 in amount. For example, the winding 13A in Figure 1 corresponds to the winding 113A in Figure 2. The windings 113A, 113B and 113C are likewise connected in a star connection as in Figure 1, but instead of the outside terminals of the star connection being connected directly to phase A, B, and C, as in Figure 1, the outside terminals of the star connection in Figure 2 are connected respectively to the terminals of the motor 3. In other words, whereas in Figure 1 the compensating or saturation control windings 13 are connected directly to the generator, such windings are directly connected to the motor in Figure 2. The frequency and operation illustrated in Figures 1 and 2 are otherwise essentially the same.

Thus, the systems described herein serve the necessary function of controlling voltages in relationship to frequency over a wide range of speed of the generator so as to maintain the correct saturation of the stator iron of a three phase motor which is energized by the generator, rendering a variable speed of the motor with a correct voltage for any frequency within an extended frequency range so as to permit variation of the speed of the three phase motor by merely varying the speed of the generator. It is obvious that ordinary voltage regulation as such will not produce this result. It is necessary to provide regulation that controls the voltage in a wide range, so that saturation is correct at any frequency or speed of said generator or motor within a relatively large range. It is observed that the electrical regulating control system has no moving parts and is assembled in the manner of a transformer with three separate windings on each leg of a three phase transformer laminated structure. In both systems there is a current winding which is directed in series between the generator and the load having relatively few turns with a conductor large enough to carry the load current, such winding being wound directly around the laminated core, but not using the full length of the core, leaving part of the core bare for the compensating or saturation control winding. The second or booster winding 12 is similar to the secondary winding of a conventional current transformer and is wound on top of the first winding, i. e., current winding to provide, as described above, a close coupled magnetic circuit. The current in the second or booster winding would have a direct ratio to the current in the first or current winding were it not for the third winding 13 which is wound magnetically loose coupled directly on the laminated core in the vacant space which is left along side of the first and second windings. This third winding is connected in bucking relation to the first or current winding. It is also observed that the excitation of the generator is in part dependent upon the voltage induced in the second or booster winding. The current from this second winding tends to boost the excitation as the load increases which, of course, is necessary to maintain the correct voltage; however, the voltage in this second winding is also affected by the power factor and the frequency. I have discovered that by placing the correct number of turns in the third winding and connecting it in bucking relation to the first or current winding across the generator output terminals as shown in Figure 1, that the current and voltage in the third or saturation control winding will vary the coupling between the booster winding and the current winding in such a manner as to automatically maintain the correct field voltage boost to meet the load or frequency condition liable to be encountered. The output voltage of the generator remains constant for a constant speed, but varies in proper proportion with the speed, so as to maintain the proper regulation between voltage and frequency. The higher the voltage applied to the compensating winding, the more it will neutralize the magnetic lines of flux induced in the iron by the current winding, thus weakening the current induced in the booster winding, automatically correcting the over-voltage condition which would occur under certain combinations of load, power factor and speed. It is observed also that ampere output and voltage are used in this control. The system also uses to advantage the fact that the simplest way to lessen the output of a transformer is to presaturate the core. Further, the system uses to advantage the fact that in an inductive alternating current circuit the lower the frequency, the lower the voltage required to cause the same amount of current to flow. This unique but simple system combines these natural tendencies to maintain the output voltage of the generator in harmony with its frequency and speed, causing the motor to develop the same torque whether running at rated speed of half of rated speed.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. In an electrical circuit including a generator having an armature winding and a field winding, a variable load with variable power factor and also variable frequency and a rectifier for supplying extra exciter current to said field winding when needed, a 3 leg, 3 phase transformer comprising a 3 leg magnetic core and a current winding on each leg connected in series between said generator armature winding and load, a second 3 phase winding wound directly around and on the outside of said current winding and close coupled magnetically thereto, said second winding being electrically connected to said rectifier so as to boost the said field when necessary, a third 3 phase winding on said 3 legs but loosely coupled magnetically to said first and second said windings, said third winding being electrically connected across the generator armature load in bucking relation to said second winding.

2. In an electrical circuit including a generator having an armature winding and a field winding, a variable load, and a rectifier for supplying exciter current to said field winding, a transformer comprising a magnetic core and a primary winding serially connected between said generator armature winding and load, a secondary winding connected in circuit with said rectifier and said field winding and having current induced therein by transformer action when current is present in the primary winding, said induced current being delivered to said rectifier and then to said generator field winding for regulating the generator output voltage, and means including a saturation control winding on said transformer having opposite terminals thereof connected in shunt with a portion of the serial circuit which comprises said armature winding, said load and said current winding, and said saturation control winding and primary control winding each respectively producing a magnetic flux as a result of current flow therethrough which is in opposition to each other in said magnetic core.

3. The arrangement set forth in claim 2 in which said saturation control winding is connected in shunt with said generator armature windng.

4. The arrangement set forth in claim 2 in which said saturaton control winding is connected in shunt with said variable load.

5. The arrangement set forth in claim 2 in which said load comprises an alternating current motor, means for varying the speed of said generator to thereby vary the speed of said motor.

6. In an electrical circuit including a generator having an armature winding and a field winding, a variable load, and a rectifier for supplying exciter current to said field winding, a transformer having a magnetic core and a primary winding serially connected between said generator armature winding and said load, a secondary winding connected in circuit with said rectifier and said field winding and having current induced therein by transformer action when current is present in the primary winding, said induced current being delivered to said rectifier and then to said generator field winding for regulating the generator output voltage, means including a saturation control winding on said transformer connected in bucking relationship to said primary winding and having opposite terminals thereof connected in shunt with a portion of the serial circuit which comprises said armature winding, variable load and primary winding, to influence the induced current in said secondary winding, said secondary winding being coupled magnetically only without a conductive connection to said primary and saturation winding.

7. The arrangement set forth in claim 2 in which said primary and secondary windings are close coupled and in which said saturation control winding is loosely coupled to said primary and secondary windings, and said saturation control winding functioning to effectively vary the coupling between said primary and secondary windings.

8. The arrangement set forth in claim 7 in which said primary and secondary windings are close coupled and in which said saturation control winding is loosely coupled to said primary and secondary windings and serves to effectively vary the coupling between said primary and secondary windings.

9. In an electrical circuit including a generator having an armature winding and a field winding, a variable load, and a rectifier for supplying exciter current to said field winding, a transformer having a magnetic core and a primary winding serially connected between said generator armature winding and load in a serial circuit, a second winding connected in circuit with said rectifier and said field winding and having current induced therein by transformer action when current is present in the primary winding, said induced current being delivered to said rectifier and then to said generator field winding for regulating the generator output, and a separate transformer winding having opposite terminals connected to and in shunt with a portion of said serial circuit and operative to induce a flux in said magnetic core in opposition to the flux produced by said primary winding, said second winding being coupled magnetically only without a conductive connection to said primary and said separate winding.

10. The arrangement set forth in claim 9 in which said primary and second windings are close coupled and in which said separate control winding is loosely coupled to said primary and second windings and serves to effectively control the coupling between said primary and second windings.

11. The combination of a generator having an armature winding and a field winding, three phase output leads connected to said generator armature winding, a three phase load, a three-legged transformer including primary, secondary and saturation control windings on each core leg, the primary winding having two terminals, one terminal of the primary winding being connected to one of said output leads, the other terminal of the primary winding being serially connected through said three phase load to a second one of said output leads, a rectifier connected in circuit with a secondary winding and said field winding, said secondary winding having current induced therein by transformer action when current is present in said primary winding, said induced current being directed through said rectifier to supply said generator field winding with an exciter current proportional to the load, each of said saturation control windings having opposite terminals thereof connected in shunt with a portion of the serial circuit which comprises the generator armature winding, load and primary winding, said saturation control winding producing a magnetic flux in opposition to the flux produced by said primary winding in a corresponding core leg, said secondary winding being coupled magnetically only without a conductive connection to said primary and saturation winding.

12. The arrangement set forth in claim 11 in which said primary and secondary windings are close coupled and said saturation control winding is loose coupled to said primary and secondary windings and serves to effectively control the coupling between said primary and secondary windings.

13. The combination of a generator having an armature winding and a field winding, three phase output leads connected to said generator armature winding, a three-legged transformer including primary winding, secondary winding and saturation control windings on each leg thereof, a variable three phase load output to be supplied by said generator armature winding, a rectifier output to supply exciter current to said generator field winding, said primary windings being connected in series with said generator armature winding and load in serial circuit, said secondary windings being star connected with the non-common terminal of the star being connected through said rectifier to said field winding, corresponding saturation control windings having opposite terminals thereof connected to and in shunt with a portion of said serial circuit, and with corresponding saturation control windings and primary windings producing opposing magnetic fluxes in corresponding legs of said transformer, said secondary windings being coupled magnetically only without conductive connections to said primary and saturation windings.

14. In a system of the character described, a generator having an armature winding and a field winding, a battery, a rectifier, a variable three phase load receiving current from said generator armature winding, a three-legged laminated magnetic core, primary, secondary and saturation control windings on each leg of said core, each winding including two terminals, input leads connecting one terminal of each of said primary windings with corresponding terminals of the generator armature winding, the other terminal of each of said primary windings being connected to corresponding terminals of said load whereby said primary windings are serially connected between said generator and said load in a serial circuit, said secondary windings being star connected with the non-common terminal of each secondary winding being connected to one terminal of said rectifier, saturation control windings having opposite terminals thereof connected in shunt with a portion of a corresponding one of said serial circuits, with corresponding primary and saturation control windings producing opposing fluxes in corresponding core legs, said battery being serially connected with said field winding and with said rectifier means, said secondary windings being coupled magnetically only without conductive connections to said primary and saturation windings.

15. In a regulating system of the character described wherein it is desired to control the speed of an alternating current motor, transformer having a primary winding, a secondary winding and a saturation control winding on a common core, an input voltage source, said voltage source, primary winding and motor being serially connected, said voltage source comprising a generator with an armature winding and an associated field winding for regulating the voltage output of said voltage source, rectifier, said secondary winding being connected in circuit with said rectifier and said field winding, said saturation control winding having opposite terminals thereof connected in shunt with a portion of the serial circuit which comprises said armature winding, motor and primary winding, said secondary winding being coupled magnetically only without a conductive connection to said primary and saturation winding.

16. A regulating system of the character described comprising: an alternating current generator, having an armature winding, a motor, a transformer having a primary winding, a secondary winding and a saturation control winding, each of said windings being wound on a common magnetic core, a first serial circuit comprising said generator armature winding, primary winding and motor, said generator armature having a field coil, rectifier means, said saturation control winding having opposite terminals thereof connected to and in shunt with a portion of said first serial circuit, said secondary winding being coupled magnetically only without a conductive connection to said primary and saturation winding.

17. In a regulating system of the character described, a transformer having a primary winding, a saturation control winding and a secondary winding, a generator having an armature winding, a load circuit fed by said generator armature winding, a first serial circuit comprising a generator armature winding, primary winding and said load circuit, each of the aforementioned transformer windings having a common magnetic core, said saturation control winding having opposite terminals thereof connected to and in shunt with a portion of said first serial circuit and producing a magnetic flux in said core in opposition to said flux produced by said primary winding, said generator having a field coil, a first pair of rectifiers connected in a second circuit with said field coil, a third circuit, a second pair of rectifiers connected in said third circuit with said field coil, said first pair and said second pair of rectifiers being poled for the flow of unidirectional current in the corresponding second and third circuits, the junction point of said first pair of rectifiers being connected to one terminal of said secondary winding, the other terminal of said secondary winding being connected to the junction point of said second pair of rectifiers, said secondary winding being coupled magnetically only without a conductive connection to said primary and saturation winding.

References Cited in the file of this patent
UNITED STATES PATENTS 2,668,270     Baume _____ Feb. 2, 1954